United States Patent Office 3,116,301
Patented Dec. 31, 1963

3,116,301
EPOXYESTERS OF 3,4-DIHYDROPYRAN-2-CARBOXYLIC ACIDS
Paul H. Williams and Roy T. Holm, Orinda, Calif., assignors to Shell Oil Company, New York, N.Y., a corporation of Delaware
No Drawing. Filed Mar. 7, 1962, Ser. No. 177,967
5 Claims. (Cl. 260—345.8)

This invention relates to a new class of carboxylic acid esters and more particularly to novel esters of dihydropyran carboxylic acids and epoxy alcohols.

The novel epoxyesters of dihydropyran carboxylic acids of the invention can be conveniently represented by the following general formula

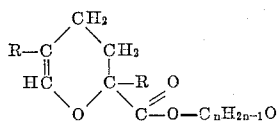

wherein R is a member selected from the class consisting of hydrogen and lower alkyl groups having 1 to 5 carbon atoms, $n$ is an integer from 3 to 18 and $C_nH_{2n-1}O$ is an epoxyalkyl group in which O is the oxirane oxygen atom. The expression epoxyalkyl group is here used to mean an alkyl group having one pair of vicinal carbon atoms to which oxirane oxygen is attached.

While various other types of esters of dihydropyran carboxylic acids have been described in the past and esters of epoxy alcohols with other types of carboxylic acids are also known, there has been no previous disclosure of epoxy esters of the present invention. Due to the presence of the epoxy group,

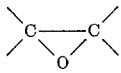

in a chain, joined by the ester linkage to the dihydropyran ring, the novel compounds of the invention have unique properties which make them advantageous in a number of practical applications. Particularly useful products can be made, for example, by reacting the new epoxy esters with hydroxy compounds to effect simultaneous addition at the double bond of the dihydropyran ring and at the oxirane oxygen ring. Using polyols for the reaction in this way produces resins, while the use of monohydroxy alcohols for the reaction results in novel plasticizers for vinyl halide and like resins. Another valuable class of new compounds which can be made from the novel epoxy esters are polyepoxy derivatives which are attractive in the preparation of epoxy resins. The compounds of the invention can also be converted to polyhydroxyesters of dihydropyran-2-carboxylic acids which are of interest as precursors of polyurethanes which can be cross-linked through the dihydropyran group. They are also valuable as stabilizers for chlorine-containing resins and can be employed as solvents and diluents.

It is accordingly an important object of the invention to provide new esters which combine in the same molecule a combination of functional groups which make these novel compounds advantageous in many fields. Another object is provision of novel epoxy esters of dihydropyran carboxylic acids of the previously indicated general formula. A still further object is the provision of glycidyl esters of this type. These and other objects of the invention will be apparent from the following more detailed description of the invention.

In its broad aspect, this invention is directed to novel epoxyesters of 3,4-dihydropyran-2-carboxylic acids of the previously given structural formula. These esters contain 9 to 34 carbon atoms per molecule and are composed only of carbon, hydrogen and oxygen atoms, specifically the pyran, epoxy and ester oxygen atoms.

One particularly advantageous embodiment of the invention encompasses the epoxyesters of unsubstituted 3,4-dihydro-1,2-pyran-2-carboxylic acid, that is, esters of the foregoing formula in which both of the R's represent hydrogen.

Representative epoxy esters of this type are, for example:

glycidyl 3,4-dihydro-1,2-pyran-2-carboxylate;
1-methyl-2,3-epoxypropyl 3,4-dihydro-1,2-pyran-2-carboxylate;
2-methyl-2,3-epoxypropyl 3,4-dihydro-1,2-pyran-2-carboxylate;
2,3-epoxybutyl, 3,4-dihydro-1,2-pyran-2-carboxylate;
3,4-epoxy-butyl 3,4-dihydro-1,2-pyran-2-carboxylate;
2,3-epoxyhexyl 3-4-dihydro-1,2-pyran-2-carboxylate;
5,6-epoxyoctyl 3-4-dihydro-1,2-pyran-2-carboxylate;
2-ethyl-2,3-epoxyhexyl 3-4-dihydro-1,2-pyran-2-carboxylate;
3,4-epoxydodecyl 3,4-dihydro-1,2-pyran-2-carboxylate; and
7,8-epoxyoctadecyl 3,4-dihydro-1,2-pyran-2-carboxylate.

Especially useful epoxy esters within the foregoing embodiment, particularly because of their superior properties, are the esters of primary alkanols of 3 to 8 carbon atoms per molecule having the epoxy group in the terminal position. Additional examples of this subgroup of esters are:

4,5-epoxyamyl 3,4-dihydro-1,2-pyran-2-carboxylate;
3-methyl-3,4-epoxybutyl 3,4-dihydro-1,2-pyran-2-carboxylate, and
7,8-epoxyoctyl 3,4-dihydro-1,2-pyran-2-carboxylate, for instance.

A second embodiment of the invention constitutes the esters of epoxy-alcohols and mono-alkyl-substituted 3,4-dihydro-1,2-pyran-2-carboxylic acids of the previously given formula in which one of the R's is hydrogen and the other is an alkyl group of 1 to 5 carbon atoms. Esters of this type are those of 2-methyl-3,4-dihydro-1,2-pyran-2-carboxylic acid;
2-ethyl-3,4-dihydro-1,2-pyran-2-carboxylic acid, 2-normal propyl and 2-isopropyl-3,4-dihydro-1,2-pyran-2-carboxylic acids;
2-normal butyl, 2-secondary butyl, 2-isobutyl and 2-tert. butyl-3,4-dihydro-1,2-pyran-2-carboxylic acids; and the 2-amyl-3,4-dihydro-1,2-pyran-2-carboxylic acids;
5-methyl-3,4-dihydro-1,2-pyran-2-carboxylic acid;
5-ethyl-3,4-dihydro-1,2-pyran-2-carboxylic acid;
5-normal propyl and 5-isopropyl-3,4-dihydro-1,2-pyran-2-carboxylic acids;
the 5-butyl-3,4-dihydro-1,2-pyran-2-carboxylic acids and the 5-amyl-3,4-dihydro-1,2-pyran-2-carboxylic acids.

Esters of these acids corresponding to the following epoxy alcohols, illustrate this embodiment of the invention:

glycidol;
1-methyl-2,3-epoxy-propanol;
2-methyl-2,3-epoxypropanol;
2,3-epoxy-butanol;
3,4-epoxybutanol;
4,5-epoxypentanol;
1,1-dimethyl-2,3-epoxy-propanol;
5,6-epoxyhexanol;
2,3-dimethyl-2,3-epoxybutanol;
6,7-epoxyheptanol;
7,8-epoxyoctanol;
2-ethyl-2,3-epoxyhexanol;
9,10-epoxydecanol;
3,4-epoxydodecanol;
15,16-epoxyhexadecanol and
7,8-epoxyoctadecanol.

As in the case of the 3,4-dihydro-1,2-pyran-2-carboxylic acid esters, which can likewise be esters of any of these alcohols, the preferred subgroup of esters is those in which the epoxyalkyl group contains 3 to 8 carbon atoms and has the oxirane oxygen linked to the terminal carbon of the epoxy-substituted chain. Especially preferred are the esters of epoxy primary alcohols.

A third embodiment of the invention is represented by the epoxyesters of 2,5-dialkyl-3,4-dihydro-1,2 - pyran - 2- carboxylic acids. These esters are represented by the previously given formula when both of the R's are alkyl groups of 1 to 5-carbon atoms each, more advantageously 1 to 3 carbon atoms each. Representative examples of these acids are 2,5-dimethyl-3,4-dihydro-1,2-pyran-2-carboxylic acid;
2-methyl-5-ethyl-3,4-dihydro-1,2-pyran-2-carboxylic acid;
2-methyl-5-isopropyl-3,4-dihydro-1,2-pyran-2-carboxylic acid;
2methyl-5-isobutyl-3,4-dihydro-1,2-pyran-2-carboxylic acid;
2-methyl-5-amyl-3,4-dihydro-1,2-pyran-2-carboxylic acid;
2-ethyl-5-normal propyl-3,4-dihydro-1,2-pyran-2-carboxylic acid;
2-ethyl-5-isobutyl-3,4-dihydro-1,2-pyran-2-carboxylic acid;
2-ethyl-5-normal amyl-3,4-dihydro-1,2-pyran-2-carboxylic acid;
2-propyl-5-tert.butyl-3,4-dihydro-1,2-pyran-2-carboxylic acid;
2-normal butyl-5-secondary butyl-3,4-dihydrol-1,2-pyran-2-carboxylic acid;
2-isobutyl-5-isoamyl-3,4-dihydro-1,2-pyran-2-carboxylic acid; and
2-normal amyl-5-tert amyl-3,4-dihydro-1,2-pyran-2-carboxylic acid Esters of these acids corresponding to any of the epoxyalcohols named in the preceding paragraph are useful new products of the invention. A preferred class of esters within this embodiment of the invention are those of the dialkyl dihydropyran-2-carboxylic acids in which the two alkyl groups are the same. Examples of these preferred esters are glycidyl 2,5-dimethyl-3,4-dihydro-1,2-pyran-2-carboxylate;
1-methyl-2,3-epoxypropyl 2,5-diethyl-3,4-dihydro-1,2-pyran-2-carboxylate;
2-methyl-2,3-epoxypropyl 2,5-di-normal propyl-3,4-dihydro-1,2-pyran-2-carboxylate;
3,4-epoxybutyl 2,5-di-isopropyl-3,4-dihydro-1,2-pyran-2-carboxylate;
4,5-epoxyamyl 2,5-di-normal butyl-3,4-dihydro-1,2-pyran-2-carboxylate;
5,6-epoxyhexyl 2,5-di-tert.butyl-3,4-dihydro-1,2-pyran-2-carboxylate;
7,8-epoxyoctyl 2,5-diamyl-3,4-dihydro-1,2-pyran-2-carboxylate and
9,10-epoxydecyl 2,5-diisoamyl-2,3-dihydro-1,2-pyran-2-carboxylate The preferred esters are those having the epoxy group in the terminal position on the epoxyalkyl chain, because of their especially advantageous properties, but esters having the epoxy group removed from the end of the chain are also useful new compounds of this invention. Particularly useful esters are those of primary epoxy alcohols of 3 to 8 carbon atoms.

The novel epoxyesters of dihydropyran-2-carboxylic acid of the three aforementioned embodiments can be made in different ways. One especially suitable method which gives high yields of desirable products in an economical manner comprises reacting a salt of the dihydropyran-2-carboxylic acid with an epoxy-substituted alkyl halide. The reaction is preferably carried out with an alkali or alkaline earth or ammonium salt of the chosen acid. U.S. Patent 2,479,283, for example, describes these and other salts of dihydropyran-2-carboxylic acids which can be used as starting materials for this process. A strong base such as a quaternary ammonium halide or the like for instance, benzyltrimethyl ammonium chloride, is advantageously used as catalyst. A substantial molar excess of epoxyalkyl halide is usually advantageous. Epoxyalkyl chlorides, bromides or iodides are generally suitable. Epibromohydrin, 2-methyl-2,3-epoxypropyl chloride, 3 - methyl-2,3-epoxybutyl iodide; 2-ethyl-2,3-epoxyhexyl chloride; 9,10-epoxydecyl bromide, and the like are typical of the epoxyhalides which can be used successfully. The reaction can be carried out conveniently by heating a mixture of the dihydropyran-2-carboxylic acid salt with the epoxyalkyl halide at about 60° to about 200° C., preferably about 100° to about 140° C. until the reaction is complete. Refluxing the reaction mixture for about 1 to 6 hours is one advantageous method of reaction. Any suitable method for recovery of the epoxy ester product can be employed. Extraction of the epoxy ester with a water-insoluble solvent therefore after diluting the reaction mixture with water and distillation of the extract is one useful method of isolation.

The following examples illustrate this method of producing the new epoxyalkyl dihydropyran-2-carboxylates in more detail, but other methods can also be used successfully for the synthesis of these compounds.

EXAMPLE I

*Glycidyl 3,4-Dihydro-1,2-Pyran-2-Carboxylate*

A reactor provided with an electrically driven stirrer and a reflux condenser having a phase separator was charged with 350 grams (2 moles) of sodium 3,4-dihydro-2H-pyran-2-carboxylate monohydrate of 96% purity and 1850 grams (20 moles) of epichlorohydrin. Four grams of tetramethyl ammonium bromide were added and the stirred mixture was heated for three hours. Refluxing began when the temperature reached about 95° C. The maximum temperature, 122° C., was reached in 2½ hours. The water which separated in the phase separator of the reflux condenser was removed as formed, 15 ml. being collected during the reaction. The coarse granular sodium dihydropyran-2-carboxylate gradually disappeared during the reaction and fine white crystals of sodium chloride appeared.

The reacted mixture was cooled and washed with water to remove the sodium chloride. The wash water was extracted with chloroform and the extract was added to the organic layer and the mixture was washed twice with water, then dried with magnesium sulfate and filtered. The chloroform and epichlorohydrin were evaporated from the filtrate on the steam bath under vacuum and the residue was distilled under 0.2 mm. mercury pressure using a Claisen distillation head to obtain the following fractions:

| Fraction | Boiling Range, °C. | Weight (gross) | Color |
|---|---|---|---|
| 1 | 28–85 | 27 | Clear. |
| 2 | 85–124 | 324 | Colorless. |
| 3 | 124–145 | 10 | light yellow. |
| Residue | | 34 | brown. |

Fraction No. 2 represents a yield of 88% of theory of glycidyl 3,4-dihydro-1,2-pyran-2-carboxylate which was redistilled to obtain 280 grams of a fraction boiling 99°–108° C. at 1 mm. mercury pressure which analyzed as follows:

| | Theory for $C_9H_{12}O_4$ | Found |
|---|---|---|
| Carbon percent | 58.7 | 58.2 |
| Hydrogen do | 6.53 | 6.5 |
| Refractive Index, 25/D | | 1.4785 |
| Epoxide value (Equivalents per 100 grams) | 0.54 | 0.51 |

EXAMPLE II

*Glycidyl 2,5-Dimethyl-3,4-Dihydro-1,2-Pyran-2-Carboxylate*

Using the method of Example I, reaction of sodium 2,5-dimethyl-3,4-dihydro-1,2-pyran-2-carboxylate with epichlorohydrin in a mole ratio of about 1:9 and employing about 1.5% of dodecylbenzyldiethyl ammonium chloride based on the weight of sodium 2,5-dimethyl-3,4-dihydro-1,2-pyran-2-carboxylate as catalyst, affords an equally good yield of glycidyl 2,5-dimethyl-3,4-dihydro-1,2-pyran-2-carboxylate.

EXAMPLE III

*Glycidyl 5-Methyl-3,4-Dihydro-1,2-Pyran-2-Carboxylate*

Using 5-methyl-3,4-dihydro-1,2-pyran-2-carboxylic acid sodium salt in place of the 2,5-dimethyl-3,4-dihydro-1,2-pyran-2-carboxylic acid salt in the method of Example II, one obtains glycidyl 5-methyl-3,4-dihydro-1,2-pyran-2-carboxylate in good yield.

EXAMPLE IV

*2-Methyl-2,3-Epoxypropyl 3,4-Dihydro-1,2-Pyran-2-Carboxylate*

Substituting 2-methyl-2,3-epoxypropyl chloride in about equal molecular amount for the epichlorohydrin in the method of Example I affords a good yield of 2-methyl-2,3-epoxypropyl 3,4-dihydro-1,2-pyran-2-carboxylate.

EXAMPLE V

*2-Methyl-2,3-Epoxypropyl 2-Methyl-3,4-Dihydro-1,2-Pyran-2-Carboxylate*

Reacting 2-methyl-3,4-dihydro-1,2-pyran-2-carboxylic acid sodium salt with 2-methyl-2,3-epoxypropyl chloride under the conditions of Example I affords 2-methyl-2,3-epoxypropyl 2-methyl-3,4-dihydro-1,2-pyran-2-carboxylate.

EXAMPLE VI

*1-Methyl-2,3-Epoxypropyl 3,4-Dihydro-1,2-Pyran-2-Carboxylate*

Reaction under the conditions of Example I using sodium 3,4-dihydro-1,2-pyran-2-carboxylate with 1-methyl-2,3-epoxypropyl chloride yields 1-methyl-2,3-epoxypropyl 3,4-dihydro-1,2-pyran-2-carboxylate.

EXAMPLE VII

*2,3-Epoxybutyl 3,4-Dihydro-1,2-Pyran-2-Carboxylate*

By replacing the epichlorohydrin in Example I with an equal molecular amount of 2,3-epoxybutyl chloride, there is obtained 2,3-epoxybutyl 3,4-dihydro-1,2-pyran-2-carboxylate.

As previously indicated, the new epoxyesters of 3,4-dihydro-1,2-pyran-2-carboxylic acids are advantageous starting materials for useful resins. They are especially valuable as components of epoxy resins which are largely polyglycidyl ethers of dihydric phenols such as 2,2-bis(4-hydroxyphenyl) propane. With these resins they can function as reactive diluents, or as cross-linking agents or both depending upon the curing conditions which are used. By using polycarboxylic acid anhydrides, for example, as the curing agent, the liquid epoxyesters of dihydropyran-2-carboxylic acids of the invention, preferably in amounts of about 5 to about 30% by weight of the resin, serve as excellent reactive diluents for reducing the viscosity of the resin without impairing the desirable characteristics of the finally cured product. With amine curing agents such as meta-phenylene diamine the new epoxyesters act as cross-linking agents which greatly improve the properties of the resin. The following example illustrates these applications of the compounds of the invention.

EXAMPLE VIII

Glycidyl 3,4-dihydro-1,2-pyran-2-carboxylate prepared as in Example I was mixed with a polyglycidyl ether of 2,2-bis(4-hydroxyphenyl)propane (Epon resin 828, registered trademark of Shell Chemical Company), to reduce the viscosity to 8 poises; 28% wt. of the ester being employed. For comparison, a mixture of the same Epon resin with butyl glycidyl ether was prepared having the same viscosity. To equal separate batches of each of these compositions there were added the stoichiometric amounts of meta-phenylene diamine and hexahydrophthalic acid anhydride required for reaction with the epoxide groups present. Sheets were then cast with each of the preparations and cured under comparable conditions. The cured resins had the following properties:

| Resin | Glycidyl 3,4-Dihydro-1,2-pyran-2-carboxylate | | Glycidyl Butyl Ether | |
|---|---|---|---|---|
| Curing Agent | Hexahydrophthalic anhydride. | meta-phenylene Diamine. | Hexahydrophthalic anhydride. | meta-phenylene Diamine. |
| Curing Conditions | 125° C. for 4 hours. | 100° C. for 2 hours, then 150° C. for 4 hours. | 125° C. for 4 hours. | 100° C. for 2 hrs., then 150° for 4 hours. |
| Tensile Properties: | | | | |
| Tensile strength (p.s.i.) | 10,900 | 13,600 | 9,800 | 11,600. |
| Elongation (percent) | 2.86 | 4.93 | 7.21 | 7.36. |
| Modulus (p.s.i. $\times 10^5$) | 5.08 | 4.98 | 5.14 | 5.10. |
| Flexibility: | | | | |
| Flexing strength (p.s.i.) | 21,700 | 24,600 | 20,460 | 20,880. |
| Modulus (p.s.i. $\times 10^5$) | 5.38 | 5.11 | 4.97 | 5.18. |
| Heat Distortion: | | | | |
| Temperature, ° C | 85.5 | 156 | 94.7 | 106. |
| Impact Resistance (Izod) (ft. lbs. per inch). | 0.51 | 0.51 | 0.46 | 0.37. |

The improvement in heat distortion resistance shown by the epoxyester of the dihydropyran-2-carboxylic acid under cross-linking conditions is outstanding. By extending the cure 20 hours at 150° C. the heat distortion temperature is raised to 182° C. which is much higher than is obtainable with this resin with any other additives. These advantageous properties of the resins make them particularly useful surface coatings, high temperature adhesives, laminates, castings, etc. Valuable products are also obtained with other curing agents which generate the required hydroxyl groups without destroying the ester linkage, for example, other aromatic amines; polybasic acids, particularly polycarboxylic acids; mixtures of polycarboxylic acid anhydrides with polyols; and polymercaptans.

The use of the epoxyesters of dihydropyran-2-carboxylic acids for resin production as above described, is only one aspect of a broader invention which is to be claimed in a separate application directed to the production of polymeric products by reaction between compounds having one or more dihydropyran rings in the molecule with hydroxy compounds which add to the pyran compound to produce linear or cross-lined polymers which are useful in surface coating and the other application indicated above for the epoxy resins made with the new compounds of the present invention.

The epoxyesters of the invention have still other applications as solvents as well as intermediates in the synthesis

We claim as our invention:

1. Epoxy ester of the formula

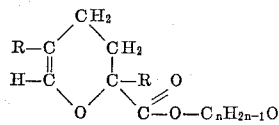

wherein R is a member of the group consisting of hydrogen or lower alkyl, $n$ is an integer having a value of 3 to 18, and $C_nH_{2n-1}O$ is an epoxyalkyl group in which O is an oxirane oxygen atom.

2. The ester of 3,4-dihydropyran-2-carboxylic acid and an alcohol of the formula $HO-C_nH_{2n-1}O$ wherein $n$ is an integer having a value of 3 to 18 and $C_nH_{2n-1}O$ is an epoxyalkyl group in which O is an oxirane oxygen atom.

3. Glycidyl esters of the formula

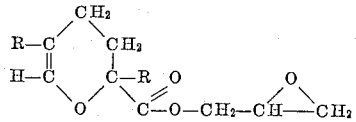

wherein R is a member selected from the class consisting of hydrogen and lower alkyl.

4. Glycidyl 3,4-dihydropyran-2-carboxylate.

5. Glycidyl 2,5-dimethyl-3,4-dihydropyran-2-carboxylate.

References Cited in the file of this patent

UNITED STATES PATENTS

| | | |
|---|---|---|
| 2,514,172 | Whetstone et al. | July 4, 1950 |
| 2,574,444 | Whetstone | Nov. 6, 1951 |
| 2,870,166 | Kubler | Jan. 20, 1959 |

OTHER REFERENCES

Swern: Chemical Reviews, volume 45, pages 1–68 (1949).